United States Patent
Bloor

(10) Patent No.: US 9,405,028 B2
(45) Date of Patent: Aug. 2, 2016

(54) METHOD AND APPARATUS FOR MULTI-COMPONENT DATUMING

(71) Applicant: ION Geophysical Corporation, Houston, TX (US)

(72) Inventor: Robert Ian Bloor, Missouri City, TX (US)

(73) Assignee: ION Geophysical Corporation, Houston, TX (US)

( * ) Notice: Subject to any disclaimer, the term of this patent is extended or adjusted under 35 U.S.C. 154(b) by 674 days.

(21) Appl. No.: 13/774,729

(22) Filed: Feb. 22, 2013

(65) Prior Publication Data

US 2014/0241124 A1    Aug. 28, 2014

(51) Int. Cl.
*G01V 1/38* (2006.01)
*G01V 1/36* (2006.01)

(52) U.S. Cl.
CPC  *G01V 1/38* (2013.01); *G01V 1/362* (2013.01); *G01V 1/36* (2013.01); *G01V 2210/53* (2013.01)

(58) Field of Classification Search
CPC ........ G01V 1/36; G01V 1/38; G01V 2210/53
USPC ................................. 367/21, 24, 38
See application file for complete search history.

(56) References Cited

U.S. PATENT DOCUMENTS

| | | | |
|---|---|---|---|
| 4,887,244 A | 12/1989 | Willis et al. | |
| 6,081,482 A | 6/2000 | Bevc | |
| 7,068,568 B2 | 6/2006 | Robertsson | |
| 7,123,543 B2 | 10/2006 | Vaage et al. | |
| 7,336,561 B2 | 2/2008 | Borresen | |
| 7,426,438 B1 | 9/2008 | Robertsson | |
| 7,676,327 B2 | 3/2010 | Ozdemir et al. | |
| 7,715,988 B2 | 5/2010 | Robertsson et al. | |
| 7,791,980 B2 | 9/2010 | Robertsson et al. | |
| 7,957,906 B2 | 6/2011 | Turnbull | |
| RE43,188 E | 2/2012 | Robertsson et al. | |
| 8,116,166 B2 | 2/2012 | Robertsson et al. | |
| 8,274,858 B2 | 9/2012 | Riyanti et al. | |
| 2006/0050611 A1 | 3/2006 | Borresen | |

(Continued)

FOREIGN PATENT DOCUMENTS

| | | |
|---|---|---|
| WO | 2010/005848 A3 | 1/2010 |
| WO | 2010/044918 A2 | 4/2010 |

(Continued)

OTHER PUBLICATIONS

Berryhill, John R., "Wave-equation datuming before stack", Geophysics, vol. 49, No. 11 (Nov. 1984) pp. 2064-2066.*

(Continued)

*Primary Examiner* — Ian J Lobo
(74) *Attorney, Agent, or Firm* — Dorsey & Whitney LLP

(57) ABSTRACT

Methods, apparatuses, and systems are disclosed for datuming multi-component seismic data. In one example of such a method, a plurality of seismic traces are accessed, the plurality of seismic traces including data representative of amplitude and spatial gradient samples of a seismic wavefield at a plurality of recording locations in a medium. Using a computer-based processing unit, a wavefield propagation from the plurality of recording locations through a medium is initialized, using the amplitude and spatial gradient samples of the seismic wavefield. Seismic traces are generated that correspond to the propagated wavefield at defined locations within the medium.

39 Claims, 11 Drawing Sheets

(56) References Cited

U.S. PATENT DOCUMENTS

| | | |
|---|---|---|
| 2006/0285435 A1 | 12/2006 | Robertsson et al. |
| 2007/0265785 A1 | 11/2007 | Robertsson et al. |
| 2009/0067285 A1* | 3/2009 | Robertsson .......... G01V 1/3808 367/24 |
| 2010/0027375 A1 | 2/2010 | Barr, Jr. |
| 2011/0134718 A1 | 6/2011 | Van Borselen et al. |
| 2011/0178714 A1 | 7/2011 | Ozdemir et al. |
| 2011/0182139 A1 | 7/2011 | Van Manen et al. |
| 2011/0292762 A1 | 12/2011 | Ozdemir et al. |
| 2012/0044782 A1 | 2/2012 | Bekara |
| 2012/0069704 A1 | 3/2012 | Cambois |
| 2012/0075950 A1 | 3/2012 | Kragh et al. |
| 2012/0183176 A1 | 7/2012 | Pires de Vasconcelos et al. |
| 2013/0028049 A1 | 1/2013 | Pan |

FOREIGN PATENT DOCUMENTS

| | | |
|---|---|---|
| WO | 2010/093740 A3 | 8/2010 |
| WO | 2011/088133 A2 | 7/2011 |
| WO | 2011/094253 A3 | 8/2011 |

OTHER PUBLICATIONS

"International Search Report and Written Opinion", issued Dec. 6, 2013, in PCT/US2013/027398, 8 pages, Dec. 6, 2013.

Robein, "Seismic Imaging: A Review of the Techniques, their Principles, Merits, and Limitations", 2010, pp. 125-135.

Hokstad, "Mutlicomponent Kirchhoff Time-migration", Technical Report CWP-313, Center for Wave Phenomena, Colorado School of Mines, 1999.

Goertz et al., "Fresnel-Volume Multicomponent Migration", 65$^{th}$ EAGE Conference and Exhibition, Jun. 2003.

Blanch, "Is De-ghosting Necessary with Multicomponent Data?", SEG Annual Meeting, 2012, pp. 1-5.

Matson et al., "Combining Free-surface Multiple Attenuation with Wavefield Continuation to Attenuate 3D Free-surface Multiples on Multicomponent Ocean-bottom Seismic Data", SEG International Exposition, 2002.

* cited by examiner

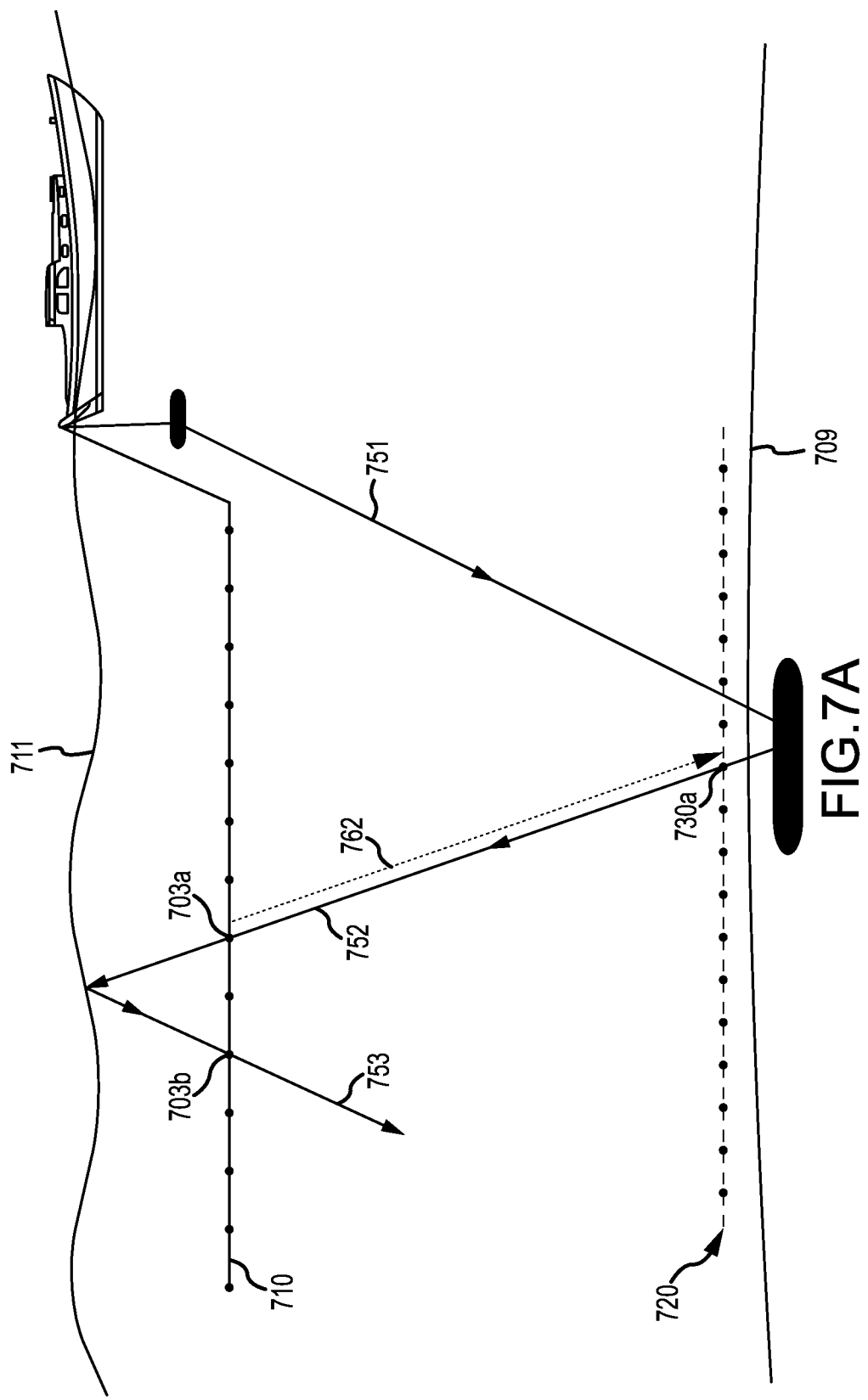

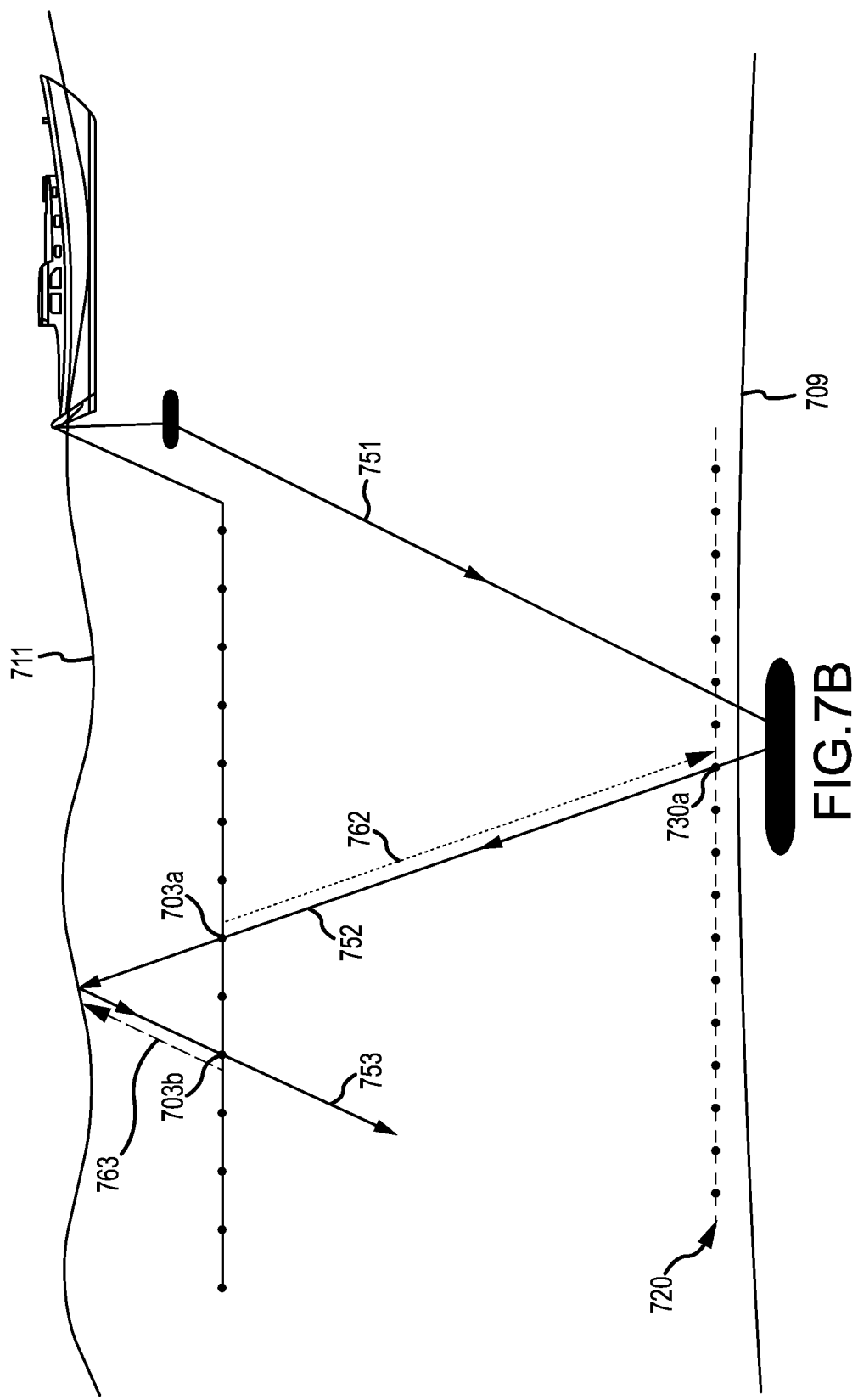

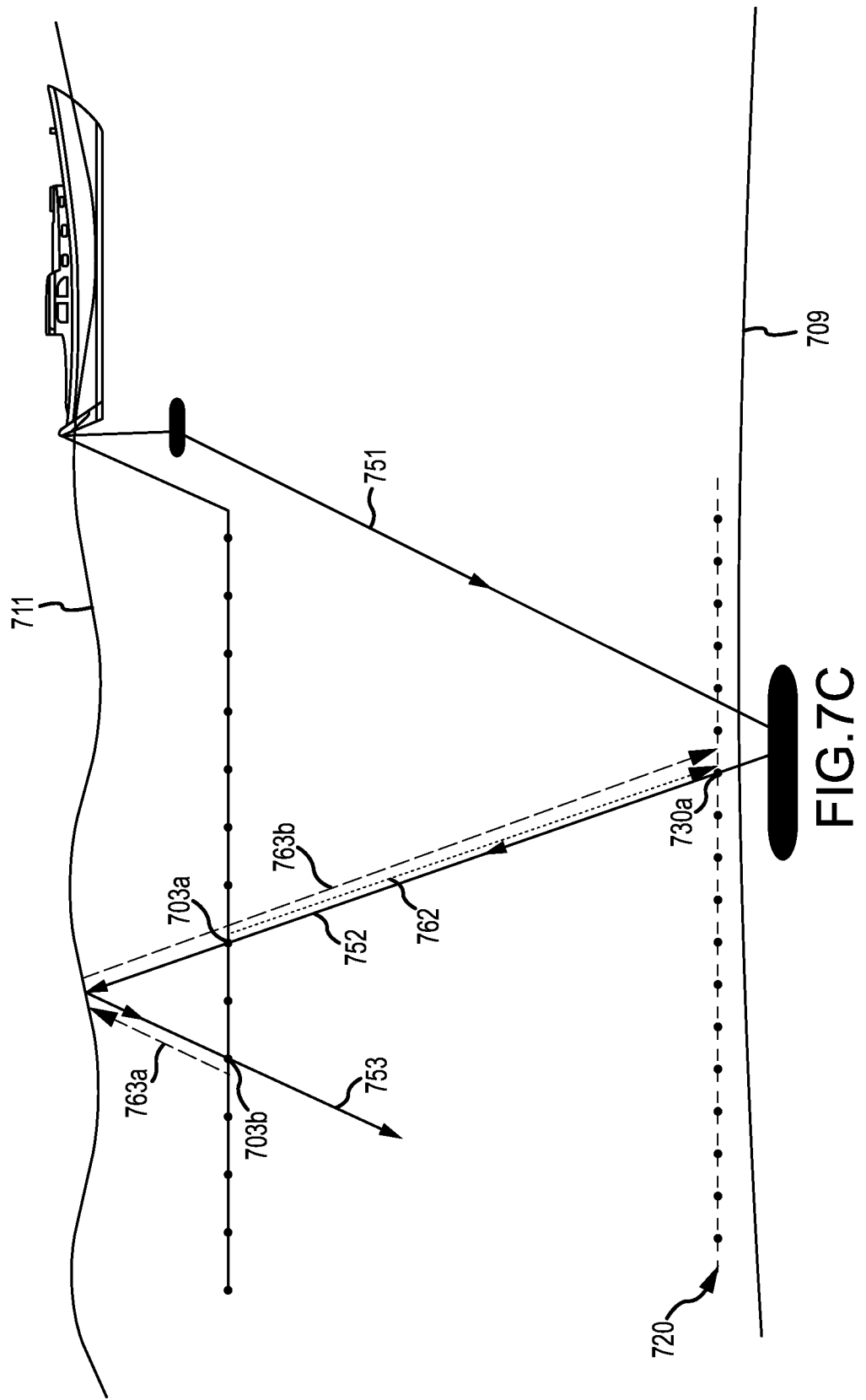

METHOD AND APPARATUS FOR MULTI-COMPONENT DATUMING

TECHNICAL FIELD

This disclosure relates generally to geophysical exploration systems, and more particularly to methods of processing multi-component seismic data obtained in geophysical surveys.

BACKGROUND

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth. By observing the reflected seismic wave detected by the receiver(s) during the survey, the geophysical data pertaining to reflected signals may be acquired and these signals may be used to form an image of the Earth near the survey location.

In marine-based acquisitions, the receiver(s) may measure the seismic wave after it is reflected from the sub-surface of the earth. The reflection from the sub-surface may, however continue upwards to the surface of the water, where it may again be reflected by the boundary between the water and the air above the water. Because the water-air boundary is a near perfect reflector, the seismic wave is reflected from the water-air boundary and propagates back towards the sub-surface. The downwardly reflecting seismic wave is detected by the receivers and is commonly known as a receiver-side "ghost." In some cases, the ghost may again reflect off of the sub-surface, and again reflect off of the water-air boundary, thus creating multiple reflections. Also, a source-side ghost may be present, which is similar to the receiver-side ghost except the source-side ghost is the seismic signal that propagated upwards to the water-air boundary from the source which then reflects off of the sub-surface.

The ghost limits the amount of energy in the seismic wavelet at very low frequencies and at higher frequencies determined by the streamer depth. Also, the phase of the seismic data is distorted around the ghost notch frequency. Surveys have historically been designed with sources and receivers towed at a relatively shallow depth in order to effectively capture the higher frequencies desired for the targets. Towing sources and streamers at a relatively shallow depth, however, can lead to distortion of low frequencies because of the increased susceptibility to noise generated by waves at the sea surface. More recently, methods have been developed to reduce ghosts and allow receivers to be towed at deeper depths by a number of methods, including specific processing methods, towing the receivers at varying depths, towing combinations of streamers at differing depths, and towing receivers with both pressure and particle motion sensors. As deghosting techniques improve and higher frequencies are recovered from the data, the limitations of streamer separation may become a limiting factor on the bandwidth of the image because it can be difficult to economically achieve adequate spatial sampling in the cross line direction.

One potential solution to the inadequate spatial sampling problem is to use some form of interpolation to predict measurements at locations in between streamers that were not physically sampled by the receivers on the streamers. Interpolation may include fitting measured seismic data to a model (e.g., using a least squares or complex conjugate method), and then extending that model to project what the seismic wavefield would have looked like had it been measured at locations in between the streamers in the same plane as the streamers. Because interpolation, by definition, involves fitting data to a model, it can introduce inaccuracies, which can subsequently propagate (and be amplified) through the remainder of the seismic data processing sequence.

BRIEF DESCRIPTION OF THE DRAWINGS

FIGS. 7A through 7C illustrate side views of a seismic surveying system in which recorded seismic data is datumed to defined locations within the water column.

DETAILED DESCRIPTION

Figure 1:
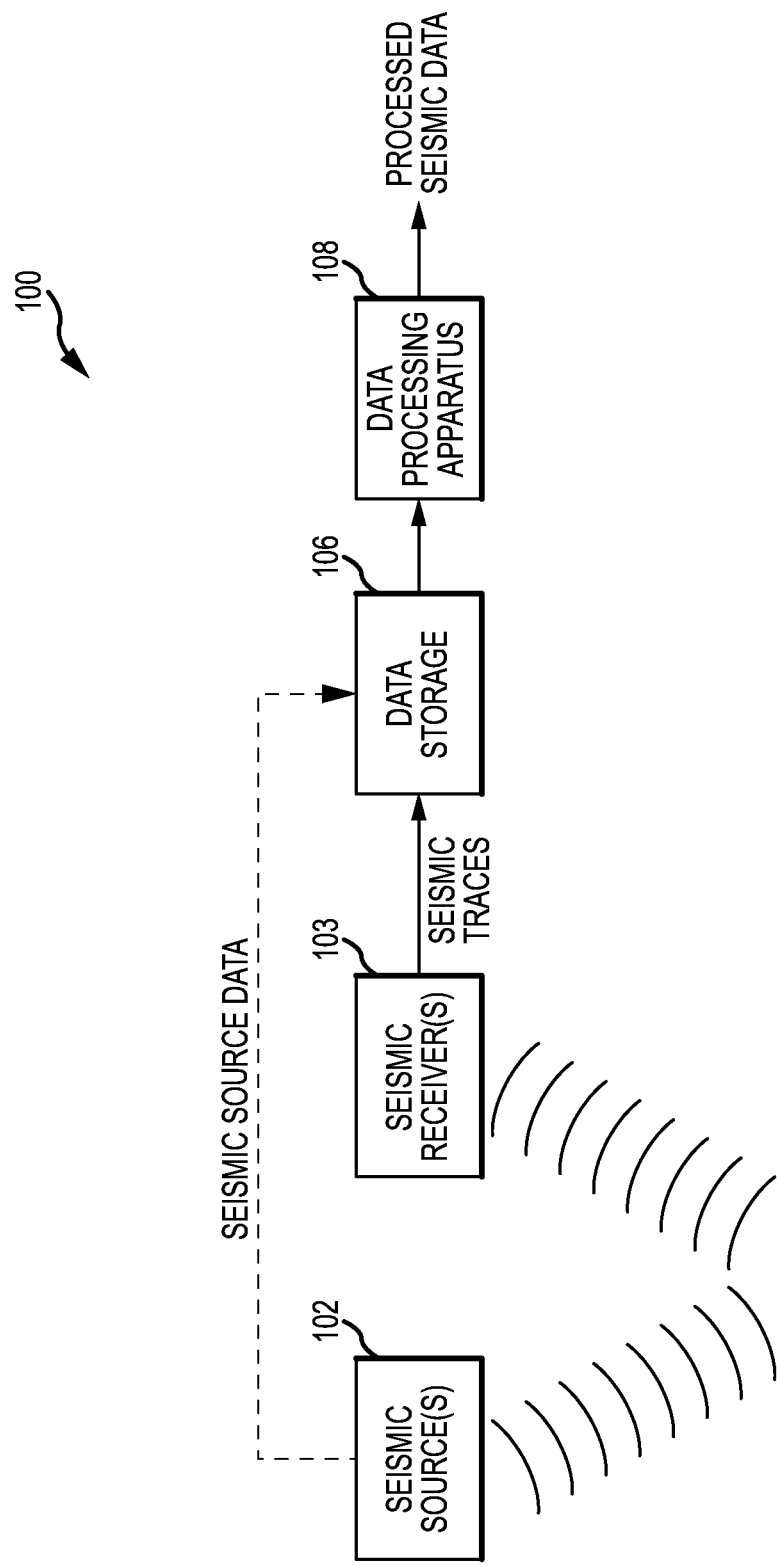
FIG. 1 is a block diagram of a seismic surveying system.

FIG. 1 illustrates one embodiment of a seismic surveying system 100. The seismic surveying system 100 includes one or more seismic sources 102, one or more seismic receivers 103, a data storage 106, and a data processing apparatus 108. The seismic surveying system 100 may be adapted for acquiring seismic data in any of a number of different geological settings. For example, the seismic surveying system 100 may be adapted for seismic acquisition in a land-based or marine-based setting in some embodiments.

The seismic source(s) 102 may be anything that emits seismic energy. For example the sources 102 may include one or more air guns (e.g., for use in a marine towed-streamer acquisition), one or more vibrators (e.g., vibrator trucks for use on land), and so forth. In some examples, the seismic sources 102 may be naturally occurring, such as a geological disturbance, background seismic noise, or seismic activity induced by hydraulic fracturing. As illustrated in FIG. 1, in some examples, the seismic sources may provide seismic source data to a data storage device 106. The seismic source data may include, for example, amplitudes, times, positions, and so forth of seismic source activity that can later be correlated with the received seismic traces from the receivers 103.

Seismic energy emitted by the seismic sources may be detected by one or more seismic receiver(s) 103. Each seismic receiver includes one or more sensors that detect a disturbance of a medium at one or more points in time. For example, a seismic receiver 103 may include a pressure sensor such as a hydrophone in some embodiments. A hydrophone detects amplitudes of a pressure wavefield over time. Another example of a seismic receiver 103 may include a particle motion sensor, which detects the motion of particles over time, which, in turn, can be related to the rate of change of a pressure wavefield over time. The particle motion sensor may detect particle motion in one, two, or three directional components. The particle motion sensor may be, for example, a geophone or a triaxial accelerometer. A motion sensor detects the motion of particles or of an elastic medium over time. A motion sensor may detect velocity, acceleration, or displacement, or some combination of these, and may do so in one, two, or three directional components. In an acoustic medium, such as water, particle motion may be proportional to the rate of change (e.g., the gradient) of the pressure wavefield, and thus data acquired using a pressure gradient sensor may be used interchangeably with data acquired using a particle motion sensor. A seismic receiver may alternatively or additionally include other types of sensors.

In some examples, a seismic receiver 103 may be multi-component in that the receiver detects more than one type of disturbance—for example, a multi-component receiver towed in a streamer in a marine acquisition system may include a hydrophone to detect pressure variations and three particle motion sensors to detect three components of motion of the water particles. The receivers 103 may in some embodiments be any of the sensors described in co-owned U.S. Pat. No. 7,167,413 issued on Jan. 23, 2007 and entitled "Towed Streamer Deghosting," the sensors described in co-owned pending application Ser. No. 13/222,563 filed on Aug. 31, 2011 and entitled "Multi-component, Acoustic-Wave Sensor and Methods," or the sensors described in co-owned pending application Ser. No. 13/011,358 filed on Jan. 21, 2011 and entitled "Seismic System with Ghost and Motion Rejection." Each receiver 103, regardless of the number of sensors, may define a station or recording location in the seismic survey.

The seismic receivers 103 may be positioned proximate the seismic sources 102 during a seismic survey. During the seismic survey, one or more seismic sources 102 may be fired, and the one or more seismic receivers 103 may measure one or more disturbances and may generate one or more traces, which are sequences of measurements over a period of time. In general, each component of each sensor may generate a trace. For example, a multi-component receiver with a pressure sensor and three particle motion sensors may generate four traces. Each trace may include or may be associated with corresponding positional information, which may be provided by a navigation system (not shown in FIG. 1).

The seismic traces generated by the seismic receivers 103 may be provided to the data storage 106 in some embodiments. The data storage 106 may be a local data storage 106 near the seismic receiver 103 and may record seismic traces from a single receiver 103 in some examples, or may be a bulk data storage 106 located at a central station and may record seismic traces from a plurality of different receivers 103 in other examples. The data storage 106 may include one or more tangible mediums for storing the seismic traces, such as hard drives, magnetic tapes, solid state storage, volatile and non-volatile memory, and so forth. In some examples, the seismic traces from the seismic receivers 103 may bypass the data storage 106 and be provided directly to the data processing apparatus 108 in order to at least partially process the seismic traces in real-time or substantially real-time (e.g., to provide quality control information).

The data processing apparatus 108 may be any computing apparatus that is adapted to process and manipulate the seismic traces from the seismic receivers 103, and, in some embodiments, the seismic source data from the seismic sources 102. The data processing apparatus 108 may be a single computing device, or may be distributed among many computing nodes in some examples. In some examples, different computing apparatuses perform different data processing operations. For example, a first may deghost seismic traces, and another may migrate seismic traces to obtain an image of the earth's subsurface. An image of interest may be a spatial indication of discontinuities in acoustic impedance or the elastic reflectivity of the subsurface, and may be displayed on a tangible medium, such as a computer monitor or printed on a piece of paper. While some embodiments of the data processing apparatus 108 may process the seismic traces until a migrated image is obtained, in other examples, the data processing apparatus 108 may only partially process the seismic traces—for example, the data processing apparatus may merely deghost the seismic traces, and provide the processed and deghosted seismic traces to another process flow for further processing.

Figure 2:
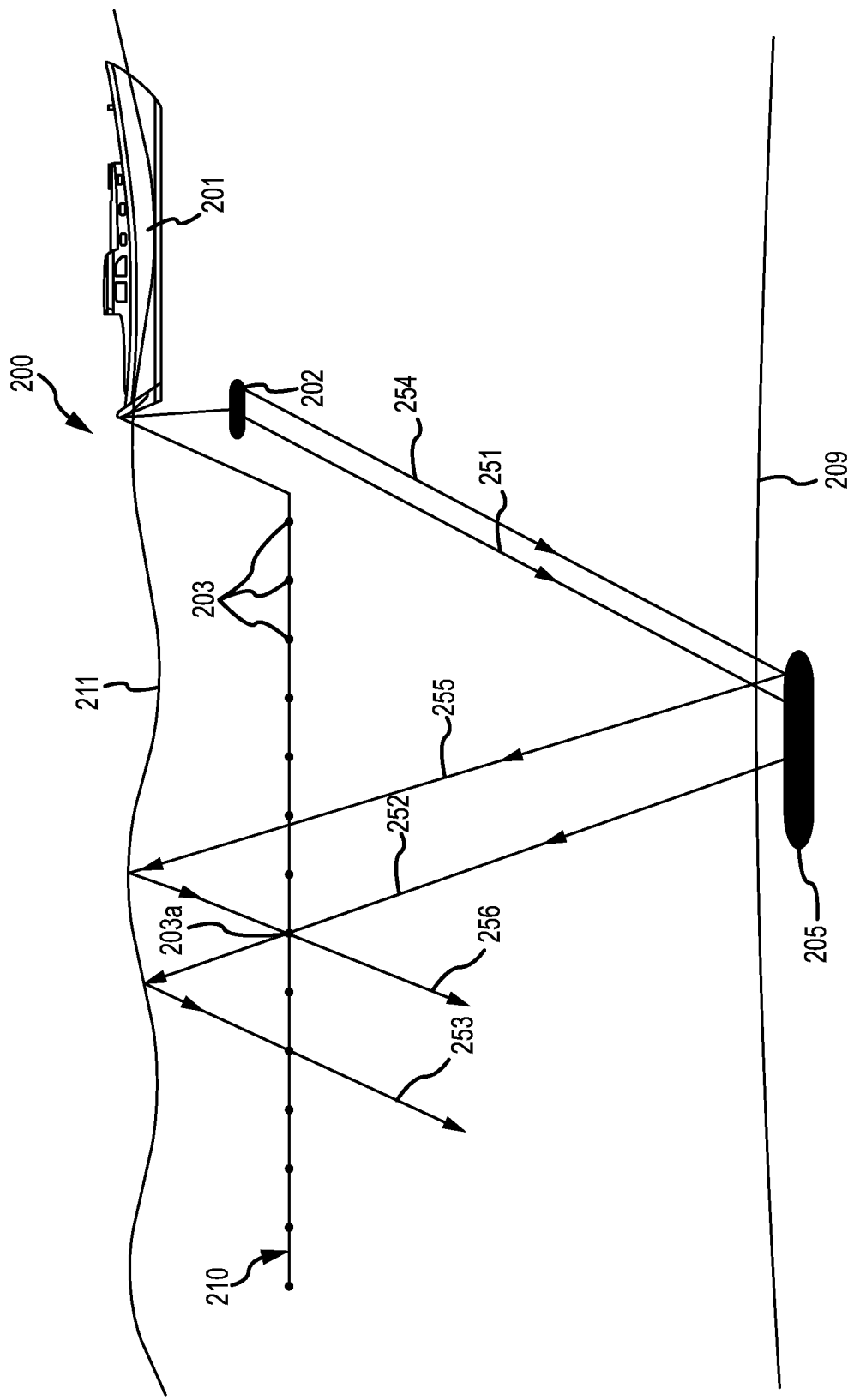
FIG. 2 illustrates a side view of one embodiment of a marine towed-streamer seismic surveying system

FIG. 2 illustrates a side view of one embodiment 200 of the seismic surveying system 100 illustrated in FIG. 1. In FIG. 2 a vessel 201 is shown towing a source 202 and several multi-component receivers 203 on one or more streamers 210 behind the vessel 201. For the sake of discussion, the embodiment depicted in FIG. 2 illustrates the source 202 and receiver 203 being towed by the same vessel 201, and a streamer 210 or streamers being towed at a single, constant depth. As will be appreciated, other combinations are possible. For example, in some embodiments, the source 202 and receivers 203 may be towed by separate vessels 201. In other embodiments, the source 202 and/or receivers 203 may be stationary while the other is towed behind the vessel 201. In some embodiments, the receivers 203 may be positioned at different depths relative to each other along a single streamer—i.e., one or more of the streamers 210 may be variable depth streamers, with any of a number of different shapes (such as a slanted line). In still other embodiments, two or more streamers 210 may be towed at different depths (e.g., an over/under streamer configuration).

During operation, the source 202 may emit or "fire" seismic energy (e.g., through an air gun), which may reflect off various portions of the Earth and may be received back at the receivers 203. The signal received at the receivers 203 may be a disturbance of the water caused by a seismic wave that reflected off of an oil and/or gas reservoir 205. In FIG. 2, the initial propagation of the seismic energy is indicated by the line 251, with the energy reflected from the subsurface indicated by line 252, and the ghost reflected from the interface of the air and sea surface 211 indicated by line 253. In practice, of course, entire wavefields propagate through the medium, but for simplicity, the wave propagation is shown using single lines 251, 252, 253 in FIG. 2.

As also illustrated in FIG. 2, one or more of the receivers 203 may detect both primary and ghost reflections. For example, in addition to the energy that initially propagates along line 251, seismic energy may also propagate along line 254 in FIG. 2 from the source 202, and this energy may reflect off of the subsurface reservoir 205 and propagate along line 255 as a primary reflection towards the streamer 210. The primary reflection 255 also reflects off of the sea surface 211, and propagates back towards the streamer 210 as a ghost 256. Both the ghost reflection 256 as well as the primary reflection 252 may be incident on a single receiver 203a, and the ghost reflection 256 and the primary reflection 252 may be overlapping in some cases, which can cause the reduction in seismic energy or notches as described above. In general, ghost reflections 253, 256 may be detected at similar or different receivers 203 as the primary reflections 252, 255, although for clarity, overlapping events at a single receiver will not be shown in FIG. 3, or FIGS. 7A through 7C. It will nonetheless be understood that the methods described herein may allow for resolution between overlapping arrivals of ghost and primary reflections at one or a plurality of different receivers, and the methods described herein may allow for mitigation of the effects traditionally associated with ghost reflections in one or a plurality of different receivers.

In some embodiments, the signals received at the respective receivers 203 may be transmitted to a storage medium on the vessel 201. The received and stored signals may, in some embodiments be partially or fully processed by computers or servers on-board the vessel 201 in real-time, near real-time, or in some cases may not be processed at all on-board but simply recorded for processing at a later time.

As mentioned above, because the water in which the multi-component receivers 203 are towed is an acoustic medium, measured three component particle motion can be directly related to the rate of change (e.g., the spatial gradient) of the pressure wavefield according to the following equation:

$$\nabla P \sim \rho \cdot V$$

in which $\nabla P$ is the rate of change or spatial gradient of the pressure wavefield, $\rho$ is the density of the acoustic medium, and V is the particle motion (e.g., velocity, acceleration, or displacement). Depending on the measure of particle motion used, the particle motion term may need to be differentiated. This relationship between the rate of change of the pressure wavefield and the particle motion may allow the use of particle motion measurements (e.g., from an accelerometer) to be used as a measure of the rate of change of a pressure wavefield, and vice versa. For example, in some embodiments, the rate of change of the pressure wavefield in the inline direction of the streamers 210 may be measured by a pair of closely spaced hydrophones. The inline rate of change measured by such hydrophones can be converted to a particle motion measurement using the equation above if desired, or can be used as-is in subsequent processing steps as described below. Similarly, the rate of change of the pressure wavefield in the crossline and vertical directions of the streamers 210 may be derived from a measured particle motion measurement using the equation above if desired.

As mentioned above, each of the multi-component receivers 203 generates a plurality of traces. Each trace may include one or more samples of the disturbance of the water caused by a passing pressure wavefield. Each multi-component receiver 203 in FIG. 2 includes a pressure sensor and a sensor whose output can be used to determine the directional rate of change of the pressure wavefield. For example, each multi-component receiver 203 may include a hydrophone to determine the amplitude of the pressure wavefield and either a three component particle motion sensor or a three component, differential pressure sensor. Depending on which type of sensors are used, the traces generated by the sensor may need to be converted—for example, particle motion traces may need to be converted to be pressure gradient traces (e.g., rate of change data may be derived from particle motion samples), and vice versa, as explained above.

The traces for each multi-component receiver 203 may together form a record corresponding to a recording location or station on a streamer 210. Because the streamers 210 are towed in the water during acquisition, the physical location of the receivers 203 may change during the subsequent samples within a single trace. As known in the art, receiver motion correction can be applied to the traces to account for the change in the location of the receivers 203. This correction can be applied prior to propagating the traces as described below, after propagating the traces as described below, or can be built into the propagation process described below.

The water through which the streamers 210 are towed is an acoustic medium, and, as such, the acoustic impedance of the water column is generally well known. Although the density of the water and the velocity of seismic waves through the water may vary depending on, for example, the temperature and salinity of the water (which may vary in both depth and the lateral directions), relatively accurate velocity models can be created for the water column, and indeed such is routinely done for conventional processing and migration of seismic data through the water column.

Figure 3:
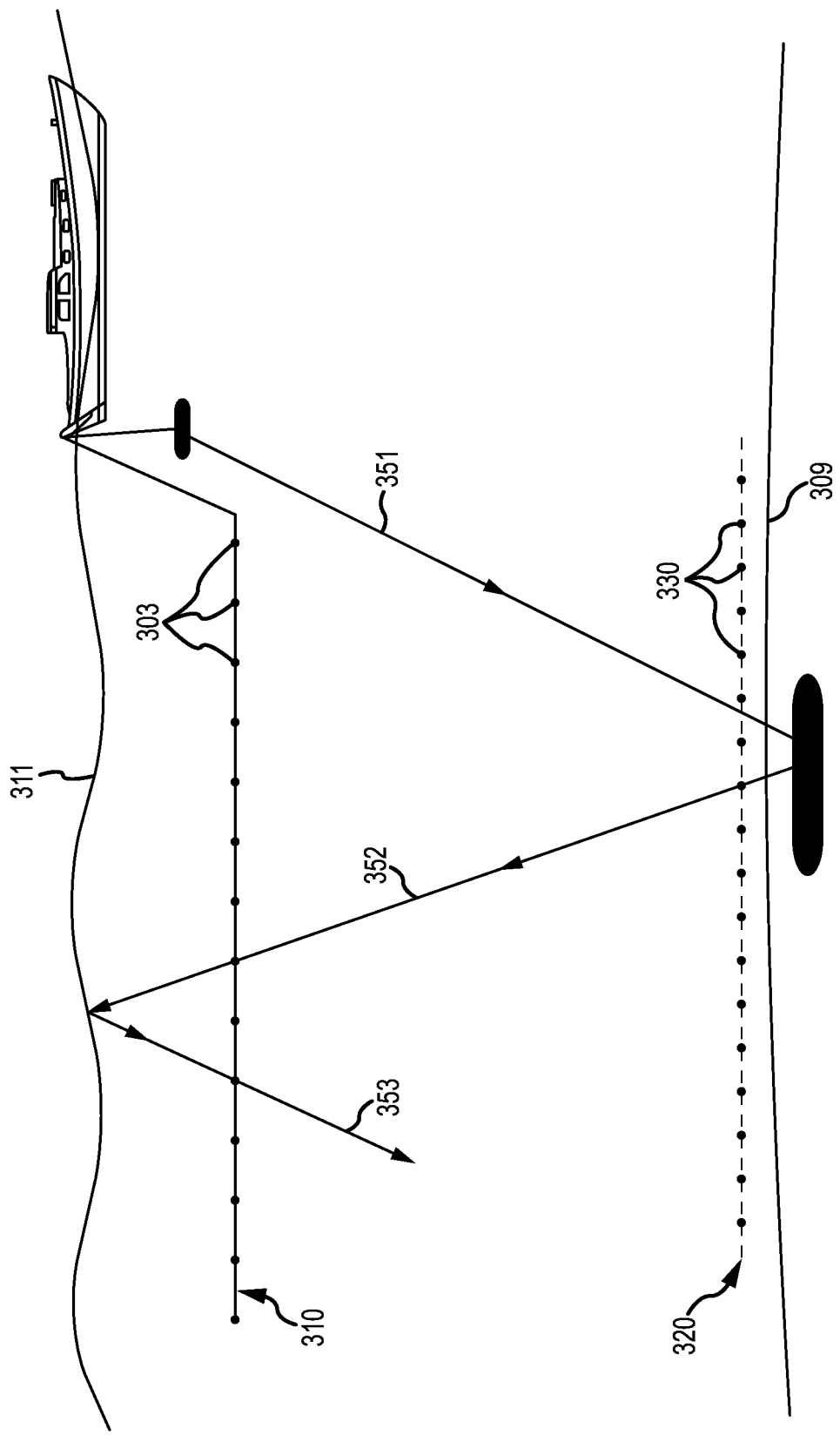
FIG. 3 illustrates a defined datum layer within the water column for the system in FIG. 2.

FIG. 3 illustrates a defined datum layer 320 that may be defined and used in the methods 400, 500, 600 described below with reference to FIGS. 4, 5, and 6. The datum layer 320 may include a plurality of defined locations 330, which may be virtual receiver locations 330. The datum layer 320 may be any arbitrary layout, and may be defined such that it can adequately represent a seismic wavefield for further processing, as explained in more detail below. Also, as explained in more detail below, the defined locations 330 in the datum layer 320 may store seismic traces as if the seismic wavefield had been measured by actual receivers at the respective defined locations 330 in the datum layer 320.

In some embodiments, and with reference to FIG. 3, the datum layer 320 may be substantially flat and substantially continuous, and thus may define a plane. In other examples, however, the datum layer 320 may have one or more non-flat areas (e.g., where the sea floor 309 is not flat) and/or one or more discontinuities (e.g., around an obstacle).

The datum layer 320 may be defined at a location vertically offset from the streamers 310—for example, the datum layer 320 may be positioned closer to the sea floor 309 than the streamers 310. The datum layer 320 may be at least 100 meters below all of the receivers 303 and streamers 310 in some embodiments. Generally, the datum layer 320 may be defined 10s of meters below the receivers 303 and streamers 310, 100s of meters below, or even 1000s of meters below the receivers 303 and the streamers 310. In some examples, the datum layer 320 may include a plurality of "virtual" streamers positioned directly below the streamers 310 such that for every physical receiver 303, a corresponding virtual receiver 330 is defined directly below the respective physical receiver with no displacement in either lateral direction. In other examples, however, the defined locations or virtual receivers 330 may be defined at any location within the water column, which may not be directly beneath a physical receiver 303.

In other examples, the datum layer 320 may be positioned in the same plane as the streamers 310, or the datum layer 320 may be positioned above the streamers 310 in the water column. For example, the defined locations 330 may be coincident with the physical streamers 303 in some examples, or the defined locations 330 may be defined at the surface 311 of the water-air boundary. In some embodiments, the datum layer 320 may even be positioned below the sea floor 309, for example, at a shallow depth below the sea floor 309 at one or more points in the layer 320, particularly if a velocity model is available for the subsurface. Positioning one or more defined locations 330 of the datum layer 320 below the sea floor 309 may require some approximations due to the elastic nature of the subsurface and the acoustic-elastic boundary at the sea floor 309, and the accuracy of such approximations may vary with the accuracy of the velocity model and the angle of incidence of the seismic waves at the interface.

Figure 4:
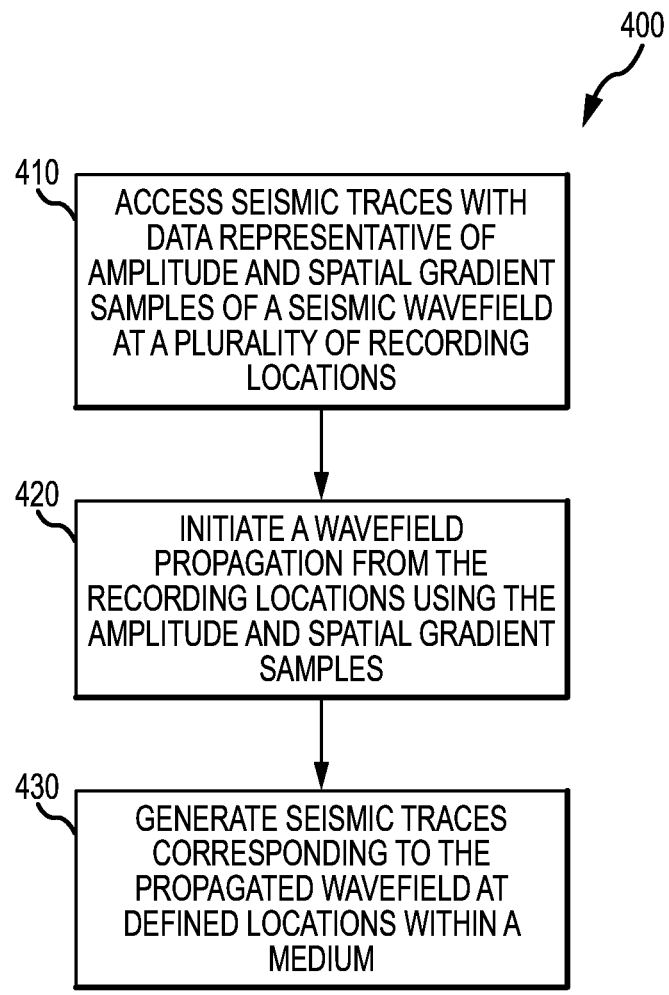
FIG. 4 is a flow chart that illustrates one embodiment of a method performed in a seismic surveying system for datuming multi-component seismic data.

Turning now to FIG. 4, a flowchart illustrating a method 400 for datuming multi-component seismic data is shown. The method 400 may be performed by the data processing apparatus 108 of the seismic surveying system 100 in FIG. 1 based on seismic traces generated by one or more multi-component seismic receivers 103, 203, 303.

In operation 410, a plurality of seismic traces are accessed, with the plurality of seismic traces including data representative of amplitude and spatial gradient samples of a seismic wavefield at a plurality of recording locations in a medium. Each seismic traces may include a plurality of samples over a period of time (e.g., 2 seconds, 10 seconds, 2 minutes, etc.), which samples may correspond to one or a plurality of shots from a seismic source. In some embodiments, four traces may be accessed for each of the plurality of recording locations—one trace representing the amplitude of a pressure wavefield, and the other three traces representing spatial gradient samples of the pressure wavefield (whether they be pressure gradient samples measured by differential pressure sensors, or whether they be particle motion samples that, while representative of pressure gradient data, may need to be converted into true pressure rate of change samples as described above).

The spatial gradient samples provide knowledge of the rate of change of the pressure wavefield and can be used to separate the upgoing and downgoing waves as recorded in the receivers. And, because the upgoing and downgoing waves can be distinguished as recorded, they can be separately propagated in operation 420. The spatial gradient samples also provide information about the relationship between two different measurements of the seismic wavefield at two different stations or receiver locations, and this information can be used to increase the accuracy of the wavefield propagation in operation 420 without requiring denser sampling of the wavefield in any given direction.

In operation 420, a wavefield propagation (also known as a wavefield continuation) is initialized from the plurality of recording locations through the medium using the amplitude and spatial gradient samples of the seismic wavefield. The recorded measurements of the pressure wavefield may then be propagated according to the acoustic wave equation. All of the components (including the amplitude and spatial gradient samples) may be used to initialize the propagation, and the propagation may continue to defined locations within the medium (e.g., the locations 330 of the defined datum layer 320 illustrated in FIG. 3). The propagation may proceed by stepping the wavefield in time and/or space to a representation of that same wavefield at a different time or in a different location within the medium.

Although several types of propagators are described in more detail below, any suitable propagator may be used for the wavefield propagation in operation 420, including the one way wave equation, the full two way acoustic wave equation (which may be a reverse-time injection method), a finite difference method, a phase shift method, a ray-based method, some combination of the foregoing, and so forth. The propagator, regardless of which one is used, may have the effect of moving recorded seismic data (in time, space, frequency, wavenumber, or another domain) to generate a representation of the seismic wavefield at another time, location, etc. That representation of the seismic wavefield can then be sampled by generating traces, as described below with reference to operation 430.

Figure 8:
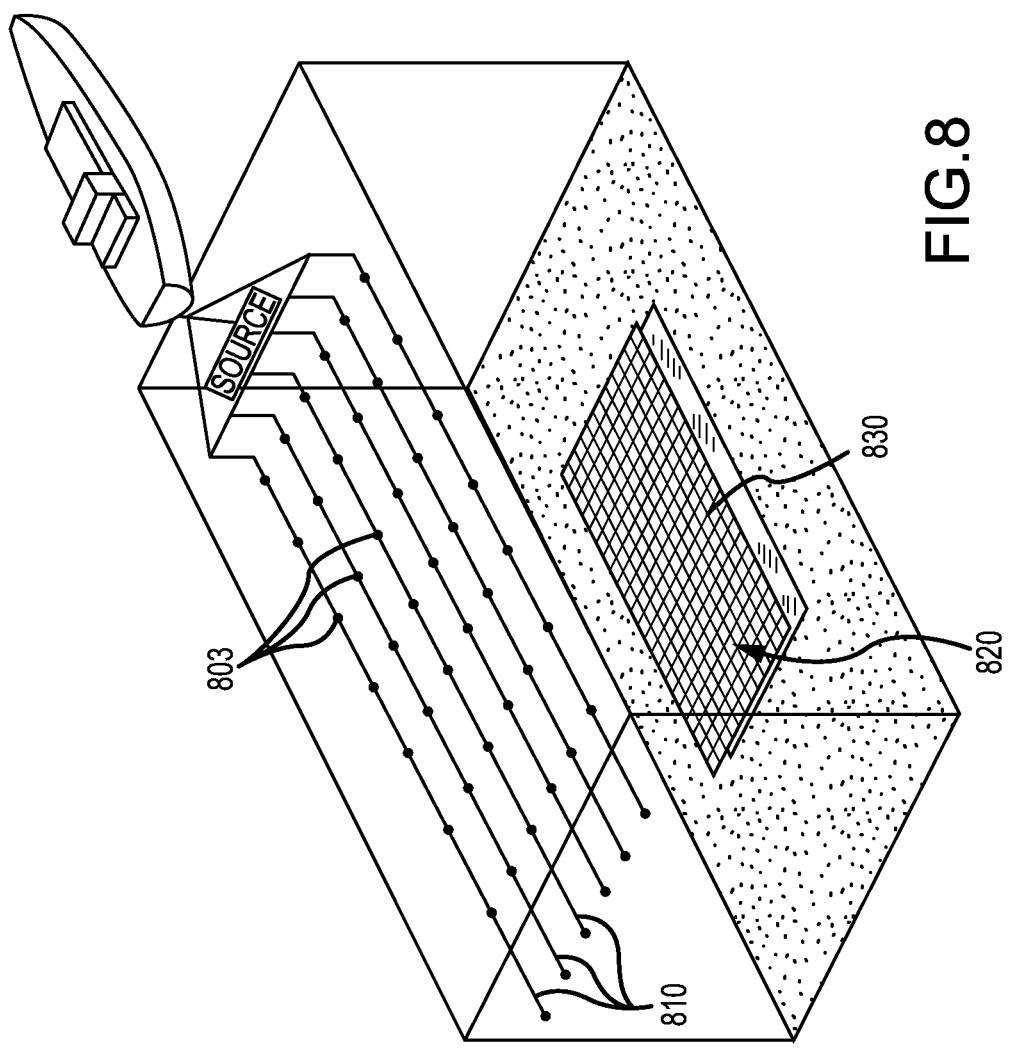
FIG. 8 illustrates a perspective view of a seismic surveying system and a defined datum layer within the water column.

Referring back to operation 420, the propagation may be a numerical propagation of the recorded wavefield in a computing apparatus, such as the data processing apparatus 108 illustrated in FIG. 8. Also, regardless of the specific type or types of propagators used, in some embodiments, the wavefield recorded at the receivers which was downgoing and had been reflected downwards from the sea surface, is propagated back towards the surface and may either be attenuated at the sea surface, or the propagation may be reflected by the sea surface and propagated back down towards the datum layer. If the later, the data propagated towards the datum layer may contribute to the recorded wave field along with the recorded upgoing data that is also propagated down towards the datum layer. Both contributions may be stored at the datum layer.

As described above, the relatively accurate knowledge of the velocity structure of the water column, together with the spatial gradient information measured by (or derived from) the multi-component seismic receivers, allows a relatively accurate propagation of the recorded seismic data to the defined datum layer without introducing many of the data errors or estimations that are made in an interpolation method as described in the background section. Instead, after the wavefield has been initialized using the pressure gradient and pressure amplitude data, the wavefront will 'heal' as the data from different receiver stations constructively works together to form the directional wavefield. In other words, as the measured amplitude measurements are propagated with the true rate of change information from the spatial gradient samples, the discrete measurements will resolve into a seismic wavefield, rather than discrete measurements of the wavefield. By recreating the seismic wavefield as it propagated through the water column, the wavefield can be arbitrarily sampled to generate traces (e.g., 'virtual' seismic traces that represent 'virtual' receiver measurements of the wavefield) at any location and at any time. Furthermore, the rate of change information from the spatial gradient samples waves that were recorded as being upgoing and downgoing can be separately propagated, such that the effects of the ghost can be reduced or removed.

In operation 430, one or more seismic traces corresponding to the propagated wavefield at defined locations within the medium are generated. Each generated trace may correspond to one defined location, or one virtual receiver location, and, like the seismic traces accessed in operation 410, may include a sequence of one or more samples of the pressure amplitude or the pressure rate of change of a seismic wavefield at one or more instances in time. The one or more seismic traces may be generated by sampling the wavefield propagation that was initialized in operation 420. In this manner, both the measured pressure amplitude and the measured or derived spatial gradient measurements constrain the data represented at the defined datum layer.

In some embodiments, the defined locations (e.g., the defined locations 330 in FIG. 3) may form a grid on the defined datum layer, and the traces may represent the propagated seismic energy at the defined locations as if the seismic wavefield had been recorded at those defined locations within the water column.

Also, in some embodiments, a plurality of datum layers may be used, with each subsequent datum layer eventually leading to the ultimate defined datum layer. In other words, the operations 420 and 430 may iteratively be repeated by setting up respective recording datum layers in the water column, propagating the seismic energy either as measured by the multi-component receivers or the seismic energy as represented in a previous recording datum layer forward one step (in time, space, or some other dimension) to form another recording datum layer. In some embodiments, data representative of each recording datum layer may be stored in a nonvolatile data storage device, whereas in other embodiments, the intermediate recording datum layers may only transitorily be stored in volatile memory of the computing apparatus until the ultimate datum layer is obtained.

As one example of using a plurality of datum layers, a first datum layer may be defined relatively deep in the water column, and a second datum layer may be defined relatively close to the air-water boundary near the physical streamer position. In this example, the recorded data may be propagated down to the first datum layer, during which propagation the wavefield may heal and have the effects of ghost reflections removed. This representation of the wavefield may then allow for propagation back up to the second datum layer, where the wavefield may be sampled at, for example, the same locations as the physical receivers, with the effects of the ghost removed. In this manner, by propagating the wavefield down and then back up to the original streamer position, the effects of ghost reflections may be removed, while maintaining the original data acquisition or recording location for the traces.

In some examples, only pressure amplitude traces may be generated for the defined datum layer, whereas in other embodiments, both pressure amplitude and spatial gradient traces may be defined for one or more of the defined locations in the datum layer. In those examples where both the pressure amplitude and the spatial gradient are included in the seismic traces corresponding to the propagated wavefield at the defined locations within the medium, the spatial gradient information can be used to deghost the transposed data (i.e., using the traces generated for the defined datum layer). In other embodiments, the original traces generated by the multi-component seismic receivers may be deghosted prior to the propagation initialized in operation 420.

Furthermore, as described above, if the propagation is such that the upgoing wavefield is reflected off of the sea surface during the propagation, the samples of the wavefield at the defined locations in the medium may include the contribution of the reflected upgoing wavefield. In this manner, the signal to noise ratio of the data in the traces at the defined datum layer may be improved with the redundant information available in the ghost reflection.

Figure 5:
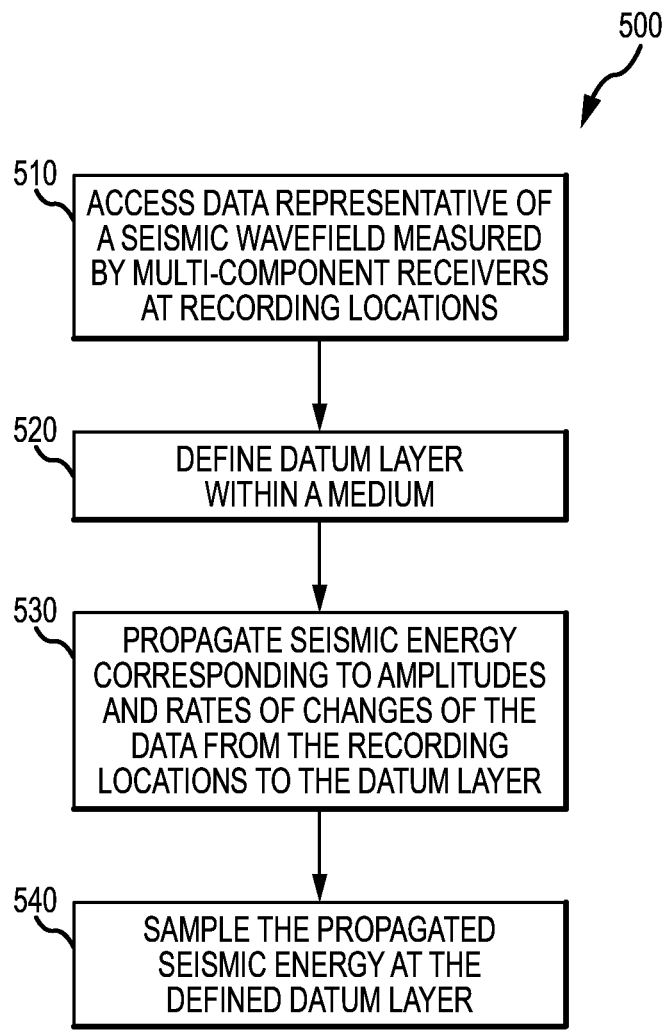
FIG. 5 is a flow chart that illustrates another embodiment of a method performed in a seismic surveying system for datuming multi-component seismic data.

FIG. 5 is a flowchart illustrating another embodiment of a method 500 for datuming multi-component seismic data that may be used in the data processing apparatus 108 of the seismic surveying system 100 based on seismic traces generated by one or more seismic receivers 103, 203, 303. The method 500 illustrated in the flowchart of FIG. 5 may in some aspects be similar to the method 400 illustrated in the flowchart of FIG. 4.

In operation 510, data representative of a seismic wavefield is accessed, where the data was measured by a plurality of multi-component seismic receivers at a plurality of recording locations in a medium. The accessed data includes amplitudes and rates of change of the seismic wavefield at each of the plurality of recording locations. In operation 520, a datum layer may be defined within the medium, as described above with reference to FIG. 3. In operation 530, a computer-based processing unit may be used to propagate seismic energy corresponding to the amplitudes and rates of change from the plurality of recording locations to the defined datum layer. In operation 540, the propagated seismic energy may be sampled at the defined datum layer, which may yield one or more virtual seismic receiver traces. The virtual seismic receiver traces may include pressure traces and/or particle motion traces in different embodiments.

Figure 6:
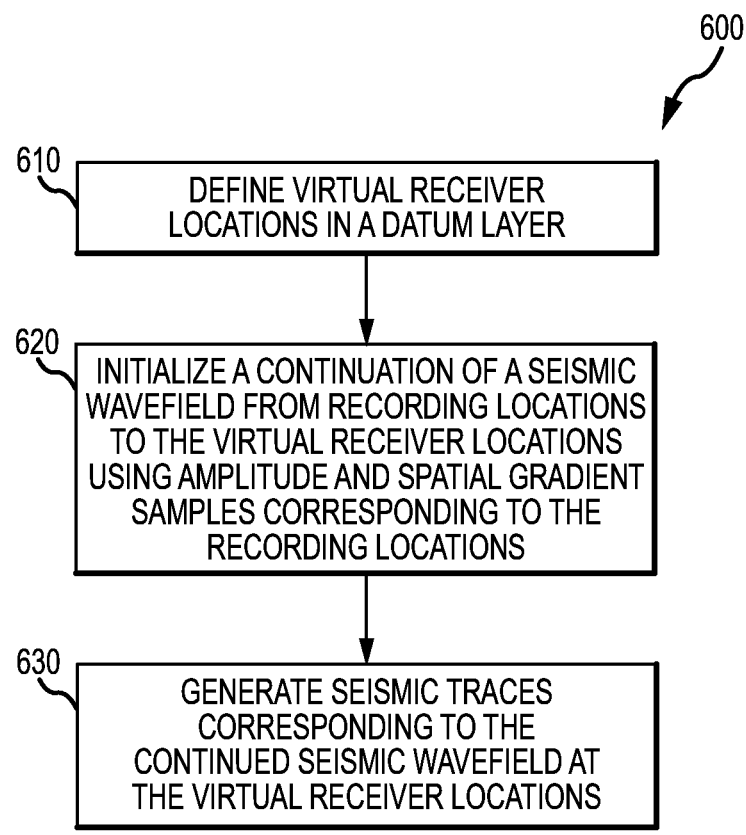
FIG. 6 is a flow chart that illustrates another embodiment of a method performed in a seismic surveying system for datuming multi-component seismic data.

FIG. 6 is a flowchart illustrating another embodiment of a method 600 for datuming multi-component seismic data that may be used in the data processing apparatus 108 of the seismic surveying system 100 based on seismic traces generated by one or more seismic receivers 103, 203, 303. The method 600 illustrated in the flowchart of FIG. 6 may in some aspects be similar to the methods 400, 500 illustrated in the flowcharts of FIGS. 4 and 5.

In operation 610, a plurality of virtual receiver locations (e.g., 330 in FIG. 3) in a datum layer may be defined within a medium. The virtual receiver locations may be defined such that the wavefield that will be propagated to them in operation 620 is adequately sampled for one or more subsequent processing steps (e.g., to avoid aliasing during migration). In operation 620, a continuation of a seismic wavefield may be initialized from a plurality of recording locations to the plurality of virtual receiver locations using a plurality of amplitude samples and a plurality of rate of change samples corresponding to the plurality of recording locations. In operation 630, seismic traces corresponding to the continued seismic wavefield at each of the plurality of virtual receiver locations may be generated.

With continuing reference to FIGS. 4 through 6, and as illustrated in FIGS. 7A through 7C, the propagation or continuation of the wavefield initialized in operations 420, 530, and 620 may not propagate the ghost wave 753 (that was recorded as being downgoing at the receivers) at all (FIG. 7A), may upwardly propagate the ghost wave 753 as indicated by 763, which may then be absorbed or attenuated at the sea surface (FIG. 7B), or may upwardly propagate the ghost wave 753 as indicated by 763*a* to the sea surface where it may be reflected and then downwardly propagate towards receiver 730*a*, where it will contribute to the representation of the wavefield stored in the defined datum layer 720 (FIG. 7C).

More specifically, with reference to FIGS. 7A through 7C, during a seismic survey, a source may emit a seismic wave 751, which may be reflected off of the subsurface. The disturbance of the water column responsive to the reflected primary wave 752 may be measured by the multi-component receiver 703*a* on the streamer 710. The reflected primary wave 752 may further continue past the streamer 710 and reflect off of the sea surface as a ghost wave 753. The disturbance of the water caused by the ghost wave 753 may be measured by the multi-component receiver 703*b* on the streamer 710. In other words the receivers 703*a*, 703*b* may generate traces with measurements of the reflected primary wave 752 and the ghost wave 753, respectively. These traces may then be accessed (e.g., in operations 410, 510, 620) to propagate the measured seismic energy in order to generate a numerical model of the wavefield as it is propagated through the water column as a function of time.

In FIG. 7A, the energy of the primary reflected wave 752 which was recorded as being upgoing at receiver 703*a* is downwardly propagated as illustrated by the line 762 by, for example, a one way propagator (e.g., a phase shift), based on the recorded amplitude and rate of change measurements and the known or estimated velocity structure of the water column. Once the energy is propagated to the receiver 730*a* in the defined datum layer 720, a trace may be generated that represents a 'virtual' measurement of the wavefield at the location of receiver 730*a*

In FIG. 7A, however, the energy of the reflected ghost wave 753 which was recorded as being downgoing at receiver 703*b* is not propagated at all in the wavefield propagation. Thus in the propagation illustrated in FIG. 7A, the only contribution to the trace generated for the defined, virtual receiver location 730*a* in the datum layer 720 is from the upwardly propagating wave 752 (which was downwardly propagated to the receiver 730*a*), and the trace generated for the defined location 730*a* may thus have the effects of the receiver-side ghost removed because it does not include any contribution of the reflected ghost wave 753.

In FIG. 7B, like in FIG. 7A, the energy of the primary reflected wave 752 which was recorded as being upgoing at receiver 703a is also downwardly propagated as illustrated by the line 762. But, unlike FIG. 7A, the energy of the reflected ghost wave 753 which was recorded as being downgoing at receiver 703b is upwardly propagated as illustrated by the line 763. The propagation of the waves 762, 763 may be accomplished by a two-way propagator, or may be separately accomplished by two, one-way propagators. In the propagation, however, the energy from the ghost wave 753 indicated by the propagation line 763 is attenuated when it reaches the sea surface 711 by, for example, creating an absorbing zone at the sea surface 711. Thus, similar to the propagation illustrated in FIG. 7A, in the propagation illustrated in FIG. 7B, the only contribution to the trace generated for the defined, virtual receiver location 730a in the datum layer 720 is from the upwardly propagating, primary reflection wave 752 (which was downwardly propagated to the receiver 730a), and the trace generated for the defined location 730a may thus have the effects of the receiver-side ghost removed because it does not include any contribution of the reflected ghost wave 753.

In FIG. 7C, like in FIGS. 7A and 7B, the energy of the primary reflected wave 752 which was recorded as being upgoing at receiver 703a is also downwardly propagated as illustrated by the line 762. Also, like in FIG. 7B, the energy of the reflected ghost wave 753 which was recorded as being downgoing at receiver 703b is upwardly propagated as illustrated by the line 763a. In the propagation, however, the upwardly propagating energy indicated by 763a is reflected off of the sea surface 711, and continues downward as indicated by 763b (which may require estimations of the location and behavior of the sea surface 711). Thus, unlike the propagations illustrated in FIGS. 7A and 7B, the trace generated for the defined location 730a may include propagated energy from the reflected ghost wave 753. However, with the appropriate time and sign corrections, the contribution from the reflected ghost wave 753, as was downwardly propagated indicated by the line 763b, may not interfere with the contribution by the primary reflection 752, but instead will constructively add to the trace and help increase the signal to noise ratio of the trace because the energy downwardly propagated from the ghost wave 753 contains redundant information as the primary reflection wave 752. Thus the propagation of energy illustrated in FIG. 7C may make use of all of the energy recorded by the receivers, even though it may require approximations of the position and behavior of the sea surface 711. The propagation of energy indicated by lines 762, 763a, 763b in FIG. 7C may be accomplished using any combination of one and two way propagators.

The propagations illustrated in FIGS. 7A, 7B, and 7C may thus all allow for the efficient deghosting of the recorded seismic wavefield. In FIGS. 7A and 7B, energy from the reflected ghost wave 753 is either not propagated at all, or is propagated but attenuated when it reaches the sea surface during the propagation. In FIG. 7C, the reflected ghost 753 is propagated such that it contributes to the trace generated for the defined location 730a without causing the usual spectral notches caused by a reflected ghost wave 753. The pressure and spatial gradient samples of the seismic wavefield measured by the multi-component receivers allows the separation and separate propagation of the upgoing and downgoing waves because they provide the propagators (e.g., wave equations) truthful data concerning how the data was measured, how it varies spatially, and so forth, which may be an improvement over conventional interpolation approaches because the propagated waves truthfully represent the wavefield using known information rather than mere fitting data to a model and interpolating to other locations.

Still with reference to FIGS. 7A through 7C, and as noted above, it will be understood that the simplified lines 751, 752, 753, 762, 763, 763a, 763b, are merely used for illustration of a concept and, in practice, energy and seismic waves do not propagate as rays in the water column.

Furthermore, with reference now to FIGS. 1 through 7C, it will be understood that although the discussion thus far has illustrated a seismic wave associated with a single seismic event, in practice, the receivers 103, 203, 303, 703a typically record many overlapping arrivals of seismic events.

If a single seismic event were to be recorded in isolation, the spatial gradient samples recorded or derived from the multi-component receivers 103, 203, 303, 703a may correspond with the direction along which the single seismic event arrived at the receiver. However, the information provided by the pressure amplitude and pressure rate of change samples measured by a plurality of multi-component receivers 103, 203, 303, 703a allows the entire wavefield to be reconstructed and propagated, even with overlapping arrivals of seismic events. The overlapping arrivals can be resolved because the multi-component samples from neighboring stations constructively work together to form a wavefront—the use of the gradient in the initiation of the wavefield propagation or continuation is what will determine the propagation direction for the respective overlapping events because the gradient is a true measurement of the rate of change of the pressure field, regardless of the number of overlapping events. In other words, when the pressure amplitude and pressure rate of change samples are used to initiate the wavefield propagation or continuation, the combination of samples from multiple recording locations has the potential to sort out overlapping arrivals because the propagated wavefield was initialized using the gradient information.

Also, with reference to FIGS. 1 through 7C, once the data has been propagated to the defined datum layer or virtual receiver locations, any number of subsequent seismic processing steps may use the generated traces as input. For example, conventional migration and imaging processes can use the data in the defined datum layer to form a seismic image that can be displayed on tangible medium, such as a computer monitor or printed on a piece of paper. Also, as described above, the resolution of the defined datum layer may have been chosen (e.g., in operation 520) such that the propagated seismic energy is adequately sampled for the subsequent processing purposed. As just one example, the datum layer may be defined such that the propagated seismic energy is adequately sampled in at least two lateral directions in order to avoid aliasing for a selected frequency during a migration processing step.

In addition to avoiding the need to interpolate the data in the new traces that correspond with what the seismic wavefield would have been if it had been measured by virtual receivers positioned in the defined datum layer, the subsequent processing steps (e.g., migration) may further benefit because the migration process may have less of the water column through which the data must first be migrated. Furthermore, it will be noted that any inaccuracies introduced by approximations of the velocity structure of the water column during the propagation of the energy in operations 420, 530, 620 would typically have been made in a conventional migration processing step, and thus those inaccuracies would appear in the migrated data in any event.

Still with reference to FIGS. 1 through 7C, and as mentioned above, receiver motion correction may be applied to the traces generated by the multi-component receivers 103, 203, 303, 703*a*, may be applied to the traces generated after propagation through the water column, or, receiver motion correction may be built-in to the propagation or continuation of the recorded seismic data. The receiver motion correction, regardless of when applied, may add a spatial and/or time shift to the data so that it appears that the data in a single trace was recorded by a receiver that was stationary.

With reference back to FIGS. 2, 3, 7A, 7B, and 7C, in some embodiments, a single streamer 210, 310, 710 with multi-component receivers 203, 303, 703*a* positioned thereon may be towed in the water column during a seismic survey. The data from the receivers positioned along the single streamer 210, 310, 710 may be used to initialize the wavefield propagation or continuation in some examples, as described above.

With reference now to FIG. 8, a perspective illustration is given of a vessel 801 towing a plurality of streamers 810, each streamer including a plurality of multi-component receivers 803. The data acquired by the multi-component receivers 803 positioned along the plurality of streamers 810 in FIG. 8 may similarly be used to initialize the wavefield propagation or continuation in some examples, as described above. In these examples, data from each streamer may be separately propagated and stored in the traces corresponding to the defined datum layer, or, the data from two or more streamers may be propagated at substantially the same time so that the data from the two or more streamers constructively works together to form the directional wavefield sooner than would otherwise be the case.

Also, in some examples, measurements from even a single receiver station can be used to initialize the propagation or continuation of the seismic wavefield, and the single receiver station (or multiple receiver stations) need not necessarily be towed on streamers behind a vessel, or even be in a marine environment.

With reference now back to operation 420 in FIG. 4, operation 530 in FIG. 5, and operation 620 in FIG. 6, together with the illustrations given in FIGS. 7A through 8, two specific examples of propagation will be given, though it will be understood that these examples are merely illustrative and that, as mentioned above, any suitable propagation technique may be used.

In one embodiment, the two-way acoustic wave equation (which is roughly similar to one element of reverse time migration) is used to initialize the propagation or continuation of the wavefield in operations 420, 530, or 620 by injecting the received wavefield with all components in reverse time order, at the respective measured amplitudes and rates of change. Data associated with a first time sample may be injected, and then shifted in space using the two way acoustic wave equation while data associated with a second time sample is injected. The data, however, is not imaged (as is done in reverse time migration), but instead, with each shifting step, a new representation of the seismic wavefield is created, with the data still contained in traces, as opposed to a migrated seismic image.

In another embodiment, a phase shift method may be used. A phase shift may be applied because it can be done with relatively few computing resources, and can be done for very high frequencies. In this example method, each of the components measured by the multi-component receivers is used to initiate a first shift of the wavefield. The entire wavefield is then phase shifted to a different location using a one way propagator, using two different one way propagators (i.e., one for the upgoing wave and one for the downgoing wave), or using a two way propagator. The phase shift may be applied by taking a Fourier transform of the data in time, and then moving certain distances in space by doing multiplications in the Fourier domain.

Referring to FIGS. 1 through 8, and as mentioned above, the wavefield may be propagated to an arbitrarily defined datum layer. In some embodiments, the sampling of the wavefield at the defined datum layer may be chosen to represent all of the frequencies recorded in the data. Also, the defined datum layer and the sampling of the wavefield at the defined datum layer may be chosen to faithfully represent the recorded frequencies.

In some embodiments, data representative of the propagated wavefield may be stored at the defined datum layer for further processing. In other embodiments, after propagation to the defined datum layer (at which point the effects of the ghost reflection are removed), the data can be propagated back to the streamer recording locations in order to, for example, have a deghosted dataset at the same streamer locations where the wavefield was originally recorded. Returning the data to the actual streamer locations can be valid for all frequencies and may not be limited by the acquisition geometry.

The use of the gradient information (e.g., from a particle motion sensor) in initializing the wavefield may effectively double the frequency that can unambiguously be defined at the defined datum layer for a given streamer spacing. Also, using the ghost together with the particle motion data allows additional frequency to be accurately represented at the defined datum layer (although use of the ghost reflection may be limited in rough sea conditions). Thus the datuming of the multicomponent data as described herein may maximize what is achievable with the recorded data without being subject to the assumptions that are inherent in an interpolation approach.

Figure 9:
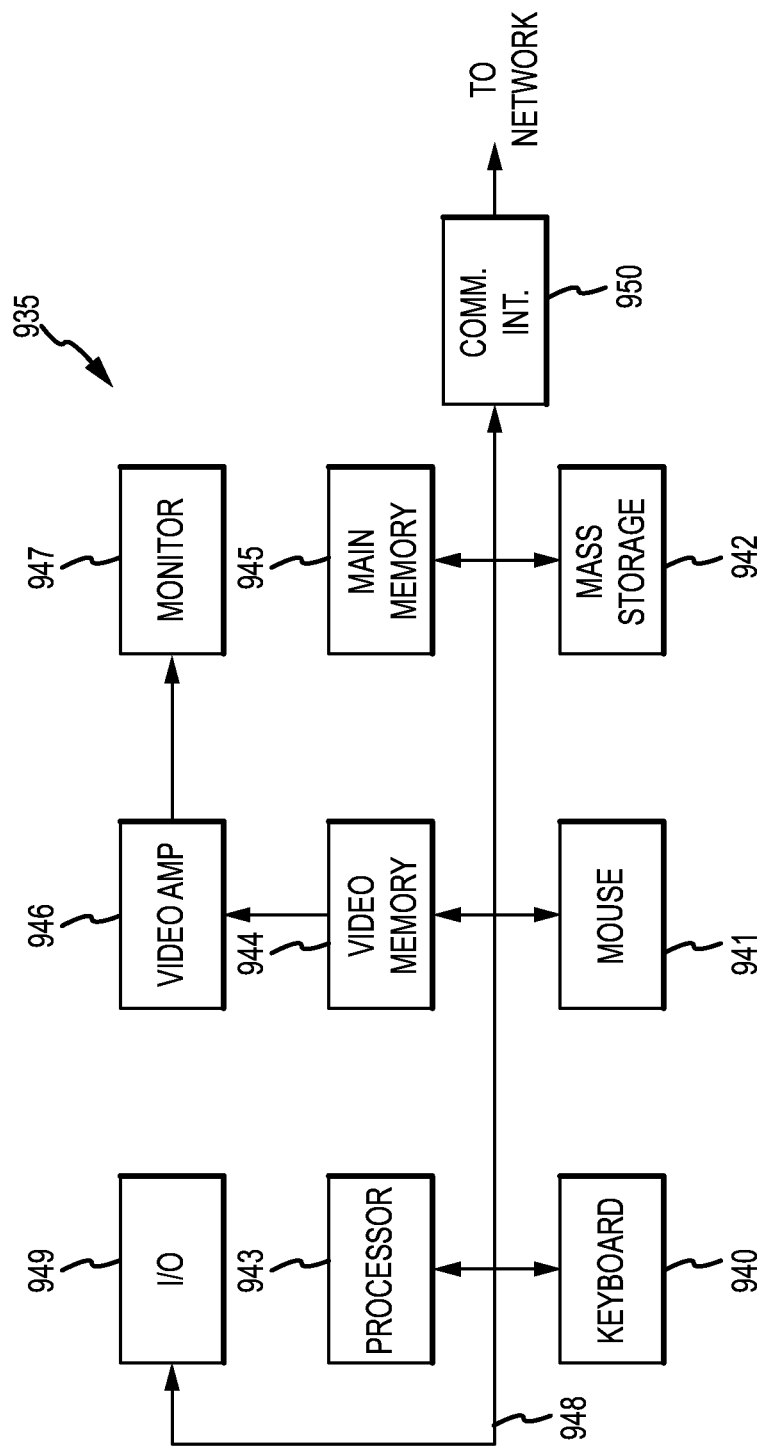
FIG. 9 illustrates an embodiment of a computer system used in a seismic surveying system that is capable of storing and/or processing seismic data, such as to datum seismic data according to the operations in FIGS. 4 through 6.

FIG. 9 illustrates an embodiment of a computer system 935 capable of processing seismic data, including for example, a system capable of executing the operations in FIGS. 4, 5, and 6. The computer system 935 illustrated in FIG. 9 may be used as the data processing apparatus 108 in FIG. 1 in some examples.

In some embodiments, the computer system 935 may be a personal computer and/or a handheld electronic device. In other embodiments, the computer system 935 may be an implementation of enterprise level computers, such as one or more blade-type servers within an enterprise. In still other embodiments, the computer system 935 may be any type of server. The computer system 935 may be onboard a vessel (such as vessel 201, 301, 801 shown in FIGS. 2, 3, and 8), may be on a remotely controlled drone boat, may be on land in a vehicle, may be in land in a facility, or any other place.

A keyboard 940 and mouse 941 may be coupled to the computer system 935 via a system bus 948. The keyboard 940 and the mouse 941, in one example, may introduce user input to the computer system 935 and communicate that user input to a processor 943. Other suitable input devices may be used in addition to, or in place of, the mouse 941 and the keyboard 940. An input/output unit 949 (I/O) coupled to the system bus 948 represents such I/O elements as a printer, audio/video (A/V) I/O, etc.

Computer 935 also may include a video memory 944, a main memory 945 and a mass storage 942, all coupled to the system bus 948 along with the keyboard 940, the mouse 941 and the processor 943. The mass storage 942 may include both fixed and removable media, such as magnetic, optical or magnetic optical storage systems and any other available mass storage technology. The bus 948 may contain, for example, address lines for addressing the video memory 944 or the main memory 945.

The system bus 948 also may include a data bus for transferring data between and among the components, such as the processor 943, the main memory 945, the video memory 944 and the mass storage 942. The video memory 944 may be a dual-ported video random access memory. One port of the video memory 944, in one example, is coupled to a video amplifier 946, which is used to drive one or more monitor(s) 947. The monitor(s) 947 may be any type of monitor suitable for displaying graphic images, such as a cathode ray tube monitor (CRT), flat panel, or liquid crystal display (LCD) monitor or any other suitable data presentation device.

The computer system includes a processor unit 943, which may be any suitable microprocessor or microcomputer. The computer system 935 also may include a communication interface 950 coupled to the bus 948. The communication interface 950 provides a two-way data communication coupling via a network link. For example, the communication interface 950 may be a satellite link, a local area network (LAN) card, a cable modem, and/or wireless interface. In any such implementation, the communication interface 950 sends and receives electrical, electromagnetic or optical signals that carry digital data representing various types of information.

Code received by the computer system 935 may be executed by the processor 943 as the code is received, and/or stored in the mass storage 942, or other non-volatile storage for later execution. In this manner, the computer system 935 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 935, the data processing system may execute operations that allow for processing seismic data, including for example the operations illustrated in FIGS. 4 through 6 and otherwise as described herein.

The apparatuses and associated methods in accordance with the present disclosure have been described with reference to particular embodiments thereof in order to illustrate the principles of operation. The above description is thus by way of illustration and not by way of limitation. Various modifications and alterations to the described embodiments will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure.

For the sake of discussion, this detailed description has focused primarily on seismic data acquired in marine, towed-streamer systems. However, the concepts described herein apply more generally to, for example, land-based systems, ocean-bottom nodes, and other acquisition systems. Similarly, for the sake of discussion, this detailed description has focused on propagating seismic energy towards the ocean bottom, but the concepts described herein applies more generally and encompass, for example, propagating the energy upwards towards the sea surface. More generally, the wavefield can be propagated to any location in any medium, including between different mediums, and the location may be chosen to ensure that the wavefield is fully sampled so that the data is truthfully represented following the propagation.

Depending on the location of the receivers and the defined datum layer, the mechanisms for initializing and propagating the wavefield may be different. When the data is recorded in a medium other than an acoustic medium, or when the receivers are in contact with an elastic medium, the wavefield can still be initialized using all of the recorded data from the multicomponent receivers. If the receivers are embedded in an elastic medium, elastic equations may be used and these may require knowledge of the elastic properties of the medium. Also, if the receivers are positioned at a solid-liquid interface or an air-liquid interface, an elastic method may need to be used to correctly initialize the wavefield.

Accordingly, it is intended that all such alterations, variations, and modifications of the disclosed embodiments are within the scope of this disclosure.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments.

All relative and directional references (including: upper, lower, upward, downward, upgoing, downgoing, left, right, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A method for geophysical exploration with multi-component seismic data, comprising:

accessing a plurality of seismic traces, the plurality of seismic traces including data representative of amplitude and spatial gradient samples of a seismic wavefield at a plurality of seismic surveying system recording locations in a medium, wherein at least some of the accessed seismic traces include a pressure trace recorded by a pressure sensor and a plurality of particle motion traces recorded by a particle motion sensor;

initiating, using a computer-based processing unit, a wavefield propagation from the plurality of recording locations through the medium using the amplitude and spatial gradient samples of the seismic wavefield; and generating seismic traces corresponding to the propagated wavefield at defined locations within the medium;

wherein the data in the plurality of particle motion traces are representative of the spatial gradient samples of the seismic wavefield at the plurality of recording locations in the medium and each generated seismic trace corresponds to one of the defined locations within the medium, at one or more instances in time.

2. The method of claim 1, wherein at least some of the accessed seismic traces include a pressure trace recorded as a function of time and a plurality of particle motion traces recorded as a function of time for each recording location, and further comprising:

converting the particle motion traces into the spatial gradient samples before said initiating.

3. The method of claim 1, wherein at least some of the accessed seismic traces include differential pressure samples measured by a plurality of differential pressure sensors and the differential pressure samples are representative of the spatial gradient samples of the seismic wavefield.

4. The method of claim 1, wherein, for each defined location, a plurality of seismic traces are generated.

5. The method of claim 4, wherein at least one pressure trace and at least one particle motion trace is generated for each defined location.

6. The method of claim 4, wherein the generated seismic traces correspond to expected measurements of the seismic wavefield if the seismic wavefield had been recorded at the respective defined locations.

7. The method of claim 1, wherein the defined locations are arranged in a gridded datum layer.

8. The method of claim 1, wherein the seismic wavefield is numerically propagated.

9. The method of claim 1, wherein, for a single seismic event recorded at one of the plurality of recording locations, one of the spatial gradient samples corresponds with the direction along which the single seismic event arrived at the recording location.

10. The method of claim 1, further comprising:
accessing the seismic traces corresponding to the propagated wavefield at the defined locations within the medium;
initiating, using a computer based processing unit, a second wavefield propagation from the defined locations back to the plurality of recording locations; and
generating seismic traces corresponding to the propagated wavefield at the recording locations.

11. The method of claim 1, wherein at least some of the defined locations are offset in depth within the medium from at least some of the plurality of recording locations.

12. The method of claim 11, wherein each respective defined location is positioned directly below a respective one of the plurality of recording locations.

13. A method for geophysical exploration, comprising:
accessing data representative of a seismic wavefield measured by a plurality of multi-component seismic receivers at a plurality of seismic surveying system recording locations in a medium, wherein each multi-component seismic receiver comprises a pressure sensor and a particle motion sensor configured for detecting data, the data including amplitudes and rates of change of the seismic wavefield at each of the plurality of recording locations in the medium;
defining a datum layer within the medium;
propagating, using a computer-based processing unit, seismic energy corresponding to said amplitudes and said rates of change of the seismic wavefield from the plurality of recording locations to the datum layer;
sampling the propagated seismic energy at the defined datum layer and;
generating seismic traces corresponding to the sampled propagated seismic energy at the defined datum layer;
wherein the data are representative of spatial gradient samples of the seismic wavefield at the plurality of recording locations in the medium and constrain corresponding data represented at the defined datum layer.

14. The method of claim 13, wherein the pressure sensor comprises a hydrophone and the particle motion sensor comprises a tri-axial accelerometer.

15. The method of claim 13, wherein the plurality of multi-component seismic receivers are positioned along a single streamer during acquisition of the data.

16. The method of claim 13, wherein the plurality of multi-component seismic receivers are positioned along multiple seismic streamers during acquisition of the data.

17. The method of claim 16, wherein the energy representative of the seismic wavefield measured by the multi-component receivers positioned along at least two of the multiple seismic streamers is propagated at substantially the same time.

18. The method of claim 13, wherein the seismic energy is propagated using a two-way acoustic wave equation.

19. The method of claim 13, wherein the seismic energy is propagated using a one-way wave equation.

20. The method of claim 13, wherein seismic energy is propagated using one of a finite difference, a phase shift, and a ray-based methodology.

21. The method of claim 13, further comprising migrating the propagated seismic energy from the defined datum layer to form a seismic image displayable on a tangible medium.

22. The method of claim 21, wherein the datum layer is defined such that the propagated seismic energy is adequately sampled in at least two lateral directions in order to avoid aliasing for a selected frequency during said migration.

23. The method of claim 13, wherein the defined datum layer is near an ocean bottom.

24. The method of claim 23, wherein the entire defined datum layer is at least 100 meters below each of the plurality of recording locations.

25. The method of claim 13, wherein the defined datum layer is substantially continuous and substantially flat.

26. A method for geophysical exploration, comprising:
defining a plurality of virtual receiver locations in a datum layer within a medium;
initializing, using a computer-based processing unit, a continuation of a seismic wavefield from a plurality of seismic surveying system recording locations in the medium to the plurality of virtual receiver locations using a plurality of amplitude samples and a plurality of rate of change samples corresponding to the seismic wavefield at the plurality of recording locations; and
generating seismic traces corresponding to the continued seismic wavefield at each of the plurality of virtual receiver locations;
wherein each recording location has a pressure sensor and a particle motion sensor configured for detecting data including the amplitude and rate of change samples, and each generated seismic trace corresponds to one of the virtual receiver locations within the medium, at one or more instances in time.

27. The method of claim 26, further comprising deriving the plurality of rate of change samples from a plurality of measured particle motion samples.

28. The method of claim 26, wherein each of the plurality of amplitude and rate of change samples are injected into the medium in reverse time order, at the respective amplitude and the respective rate of change.

29. The method of claim 26, wherein the medium comprises a water column.

30. The method of claim 26, further comprising attenuating the continued seismic wavefield as it reaches a water-air boundary.

31. The method of claim 26, further comprising reflecting the continued wavefield at a water-air boundary.

32. The method of claim 31, further comprising including said reflected wavefield in the generated seismic traces.

33. The method of claim 26, wherein the plurality of amplitude samples and the plurality of rate of change samples are corrected for receiver motion prior to being used to initialize the continuation of the seismic wavefield.

34. The method of claim 26, further comprising correcting the generated seismic traces for receiver motion.

35. The method of claim 26, wherein the plurality of recording locations are embedded in an elastic medium, and the wavefield is initialized using an elastic wave equation.

36. The method of claim 26, wherein the medium within which the virtual receiver locations are defined is an elastic medium.

37. A method for geophysical exploration, comprising:
accessing data representative of a seismic wavefield measured by a plurality of multi-component seismic receivers at a plurality of seismic surveying system recording locations in a medium, the data including amplitudes and rates of change of the seismic wavefield at each of the plurality of recording locations in the medium, each recording location having a pressure sensor and a particle motion sensor configured for detecting the data including the amplitudes and rates of change of the seismic wavefield;

defining a first datum layer within the medium;

propagating, using a computer-based processing unit, seismic energy corresponding to said amplitudes and said rates of change of the seismic wavefield from the plurality of recording locations to the first datum layer;

defining a second datum layer within the medium; and propagating, using the computer-based processing unit, the seismic energy from the first datum layer to the second datum layer, wherein the propagated seismic energy is sampled to yield one or more virtual seismic receiver traces with effects of ghost reflections removed.

38. The method of claim 37, wherein the second datum layer is substantially coincident with the plurality of recording locations.

39. The method of claim 26, further comprising migrating the propagated seismic energy to form a seismic image of a subsurface near a location of the geophysical survey.

* * * * *